United States Patent [19]

Hoac et al.

[11] Patent Number: 4,742,520
[45] Date of Patent: May 3, 1988

[54] ALU OPERATION: MODULO TWO SUM

[75] Inventors: Charles C. Hoac, Dallas; John C. Linn, Richardson, both of Tex.

[73] Assignee: Texas Instruments Incorporated, Dallas, Tex.

[21] Appl. No.: 654,819

[22] Filed: Sep. 26, 1984

[51] Int. Cl.[4] .................. G06F 11/10; G06F 7/38; G06F 7/50
[52] U.S. Cl. .................... 371/49; 364/716; 307/472
[58] Field of Search ............... 364/738, 716, 749, 748, 364/736; 371/49; 307/471, 472

[56] References Cited

U.S. PATENT DOCUMENTS

| | | | |
|---|---|---|---|
| 3,693,153 | 9/1972 | Rosenfeld | 371/49 |
| 4,049,974 | 9/1977 | Boone et al. | 371/49 |
| 4,157,589 | 6/1979 | Kapral et al. | 364/716 |
| 4,218,747 | 8/1980 | Miura | 364/716 |
| 4,224,680 | 9/1980 | Miura | 364/738 |
| 4,358,847 | 11/1982 | Susskind | 371/49 |
| 4,393,468 | 7/1983 | New | 364/736 |
| 4,413,326 | 11/1983 | Wilson et al. | 364/748 |
| 4,442,498 | 4/1984 | Rosen | 364/749 |
| 4,451,922 | 5/1984 | Dearden et al. | 371/49 |
| 4,507,748 | 3/1985 | Cotton | 364/749 |
| 4,556,978 | 12/1985 | Kregress et al. | 371/49 |
| 4,589,066 | 5/1986 | Lam et al. | 371/47 |
| 4,592,005 | 5/1986 | Kregress | 364/736 |

FOREIGN PATENT DOCUMENTS 55-108050  8/1980  Japan .................. 364/748

OTHER PUBLICATIONS

Turner, *The Illustrated Dictionary of Electronics*, p. 55, 1980, Tab Books, Blue Ridge Summit, Pa.

Primary Examiner—Gary V. Harkcom
Assistant Examiner—Dale M. Shaw
Attorney, Agent, or Firm—Melvin Sharp; James T. Comfort

[57] ABSTRACT

A system for use in conjunction with the ALUs of computers, mini-computers, micro-computers and microprocessors wherein, upon a predetermined single command, the ALUs will be arranged to operate in a parity check mode or as a mask without otherwise disturbing the normal circuit operation of the ALUs utilized.

8 Claims, 1 Drawing Sheet

ALU OPERATION: MODULO TWO SUM

BACKGROUND OF THE INVENTION

1. Field of the Invention

This invention relates to a novel circuit for use in conjunction with the ALUs of computers, mini-computers, micro-computers, or microprocessors to permit use thereof for parity check functions, masking functions and the like.

2. Description of the Prior Art

Present arithmetic logic units (ALUs) in computers, mini-computers, micro-computers or microprocessors allow operation of the exclusive OR function only in a bit by bit fashion between two input words to their respective ALUs. The problem is that the exclusive OR operation for all bits within a data word requires many exclusive OR instructions and shift instructions. It is therefore an advantage over prior art systems and a purpose of the present invention to provide circuitry for use in conjunction with the ALU circuits of the prior art computers, mini-computers, micro-computers or microprocessors which will permit their use to provide parity checking, masking and the like in conjunction with a single operation and/or instruction. Such operation will allow the computation or error detecting and correcting codes with an efficiency not attainable using the prior art ALUs.

SUMMARY OF THE INVENTION

Briefly, in accordance with the present invention, there are provided circuits in use in conjunction with the ALUs existing in the equipment to be altered for providing parity checking with the single circuit operation or for providing masking functions using a single circuit operation.

The parity checking operation is provided by including a switch in one of the two input lines to each of the ALU circuits of the system being used for parity check and providing a further line to that one input having a switch therein for receiving the output from the prior ALU circuit. In this way, one of the inputs to each of the ALU circuits is the output from the prior ALU circuit. When a parity checking operation is to be commenced, the input bits of the word to be checked are each placed on one of the input lines of an associated separate ALU circuit of the parity check circuit. A signal is then provided which will turn off the second input line to each of the ALU circuits and which will simultaneously turn on the switch connecting the output of the prior ALU to the second input of the succeeding ALU. In addition, an external input which, in this case, is a zero, is applied to the other input of the first ALU stage of the parity check circuit since it is not connected to a preceding ALU output. In this way, each of the ALU circuits will provide an exclusive OR function based upon the input thereto from the word under check and the value of the exclusive OR function of the prior ALU stage to provide an indication of the type of parity involved as the output signal from the last ALU stage. It can be seen that only a single switch operation is required to perform this parity check function.

In accordance with a second embodiment of the invention, particular bits of a word can be checked for parity by providing a mask which permits only the ALU circuits associated with the particular bits of the word to be checked to be operational with the remaining ALU circuits of the system being rendered essentially inhibited from operation. This operation is provided by utilizing a bank of ALU circuits as in the prior embodiment and providing an external input signal to one of the inputs of the first stage through a switch with the output of each ALU circuit being coupled to one of the two inputs of the following ALU circuit through a switch as in the prior embodiment. In addition, an AND gate is provided in conjunction with each ALU with each of the two normal inputs to the ALU being coupled as inputs to the AND gate. The output of the AND gate provides the other input to each of the ALU circuits through a switch. The switch is operated concurrently with the switch coupled to the other input of each of the ALU circuits.

For operation of this circuit, an input signal cuts off each of the standard inputs to the ALU circuits and permits and ANDed input to be transferred through the switch to one of the ALU inputs. The other input to the ALU is provided by the output of the prior state except that, in the case of the first stage, the input is a zero by definition. In this way, by placing a mask input signal on one of the standard inputs to the ALU, this mask input will operate in conjunction with the other input via the AND gate to provide a zero output therefrom in the event that ALU stage is not to be operational. It can be seen that this circuit operates in conjuntion with a single instruction signal on an input line in conjunction with the additional circuitry provided.

DESCRIPTION OF THE PREFERRED EMBODIMENTS

Figure 1:
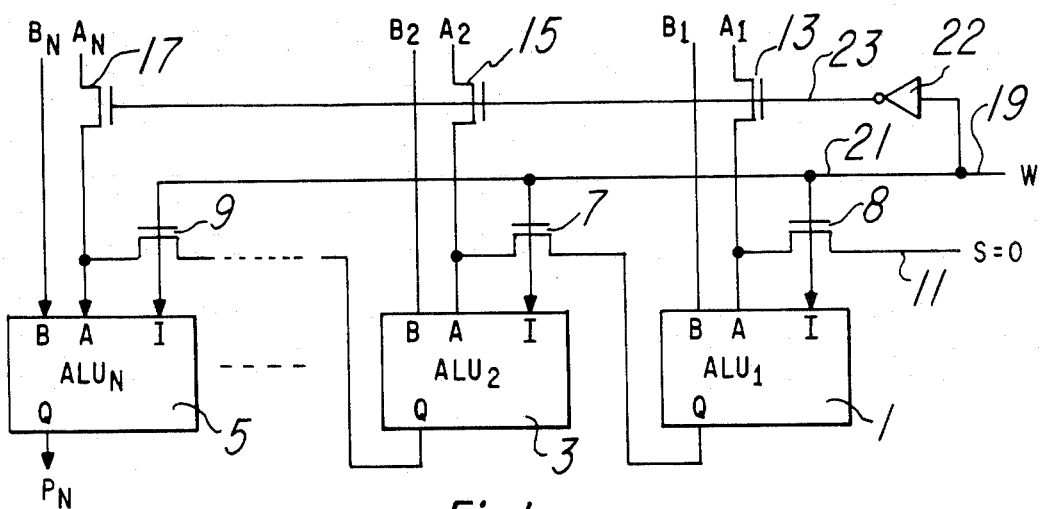
FIG. 1 is a circuit diagram of a first embodiment in accordance with the present invention for use in conjunction with parity checking operations.

Referring now to FIG. 1, there is shown a schematic diagram of a circuit in accordance with the present invention for performing parity check functions in conjunction with the ALU circuits of a computer, mini-computer, micro-computer or microprocessor. The circuit includes a plurality of ALU circuits 1, 3 and 5, it being understood that the number of ALU circuits utilized will correspond to the number of bits to be checked. Each of the ALU circuits includes three input terminals noted as B, A and I and an output terminal noted as Q. The output of each of the ALU circuits 1, 3 and 5 from output terminal Q is coupled through a switch 7 and 9 to the input terminal A of the succeeding ALU circuit. In the case of the ALU circuit 1, which is the first ALU circuit of the chain, a binary "Q" input signal is provided on the S line 11 when operation commences. The standard input source to each of the A inputs of the ALU circuits includes a switch 13, 15 and 17. Also provided is an exclusive ORing line 19 wherein a W signal is provided to enable the parity checking operation. As can be seen, the signal on the W line will travel along a first bus 21 to the switch 7, 8 and 9 and through an inverter circuit 22 to the bus 23 which operates the switches 13, 15 and 17. It is therefore apparent that when switches 13, 15 and 17 are on, switches 7, 8 and 9 are off and vice versa.

In actual operation, when a parity check is to be made on a binary word, eachbit of the binary word is applied to a different one of the B inputs B1, B2 ... Bn and an exclusive ORinge signal W is provided on the line 19 along with a zero signal on the line 11. This W signal on the line 19 will close each of the switches 7, 8 and 9 and permit the signal travelling thereto to pass therethrough to the A input of the corresponding ALU circuit 1, 3 and 5. Also, the inverted W signal at the output of the inverter 22 and on the line 23 will open each of the switches 13, 15 and 17, thereby inhibiting any inputs on the lines A1, A2 ... An from reaching the A input of the corresponding ALU. It can therefor be seen that the ALU 1 will perform an exclusive OR function with the signals on the line 11 and the line B1 with the output therefrom, which corresponds to the result of the exclusive OR function, being sent from the Q output terminal through the switch 7 to the A input of the ALU at the succeeding stage numbered 3. This same operation occurs in each of the ALU circuits. It can be seen that the output $P_N$ of the final ALU circuit 5 of the chain will be the result of the exclusive OR functions sensed in each of the prior ALU circuits and will provide an indicatin of the type of parity involved. It is readily apparent that, when the switches 13, 15 and 17 are closed and the switches 7, 8 and 9 are opened, the ALU circuits 1, 3 and 5 will operate in their normal manner and the additional circuitry added for performing the parity check function will be electronically reomved from the circuit.

Figure 2:
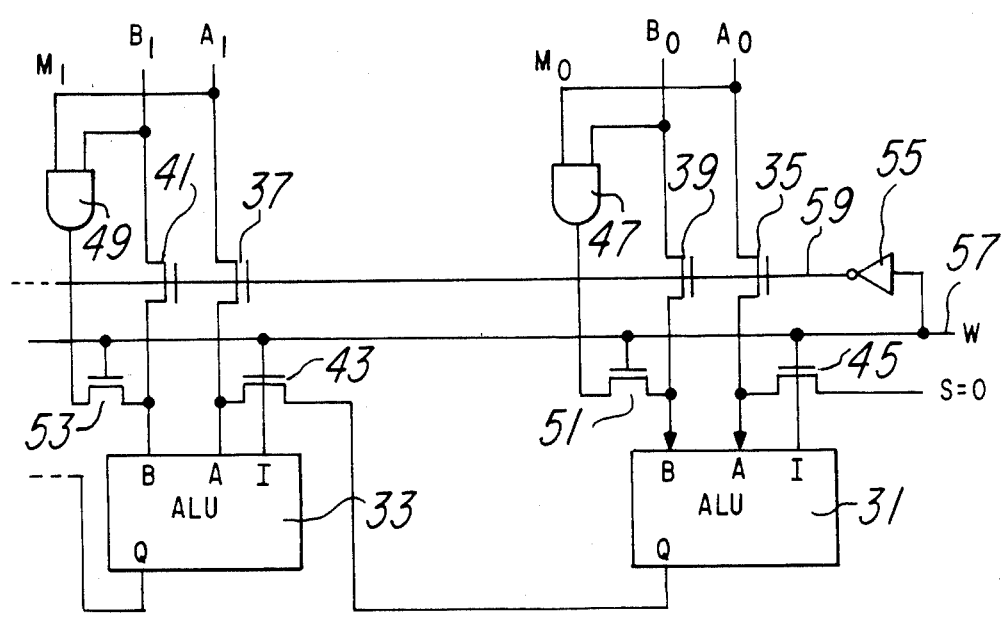
FIG. 2 is a circuit diagram of a second embodiment of the present invention for use in conjunction with masking operations.

Referring now to FIG. 2, there is shown a schematic diagram of a circuit utilizing the existing ALU circuits of a computer, mini-computer, micro-computer or microprocessor with the circuit alteration for providing a masking function, yet permitting the ALUs to operate in their standard manner when the masking function is not being provided. The circuit includes a pair of ALUs 31 and 33, it being understood that additional ALUs are provided in the circuit and connected to each other in serial order in the same manner as the ALU circuits 31 and 33 as shown. Each of the ALU circuits 31 and 33 includes the B, A and I inputs and a Q output as in the circuit of FIG. 1. In this circuit, the standard input line An to the A input of the ALU includes a switch 35 an 37 as in the prior embodiment and also a B input line to the B inputs includes a switch 39 and 41. In addition, the output Q of each ALU is coupled through a switch 43 to the A input of the succeeding ALU except in the case of the first stage 31 where the input through the switch 45 is a binary zero. Each of the An and Bn input lines to the A and B inputs of the ALUs are connected from points remote from the switches 35, 37, 39 and 41 to an AND gate 47 and 49, each AND gate being associated with one of the ALUs 31 and 33 and having as inputs the An and Bn lines associated with that ALU, thereby providing an output through a switch 51 and 53 to the B input of the associated ALU circuit 31 or 33. In addition, an exclusive ORing input W provides a signal for operation of each of the switches 43, 45, 51 and 53 and also, through an inverter 55, operates the switches 35, 37, 39 and 41. It is apparent that when the switches 43, 45, 51 and 53 are open, the switches 35, 37, 39 and 41 are closed and vice versa.

In operation, a masking function will be provided by placing appropriate ones or zeros on the An input lines A0, A1 ... Also, the word under test will be applied on a bit by bit basis to the Bn input lines B0, B1 ... Operation is commenced by placing a W signal on the exclusive ORing line 57, this signal closing the normally open switches 43, 45, 51 and 53 and the inverted signal on the line 59 at the output of the inverter 55 opening the normally closed switches 35, 37, 39 and 41. It can therefore be seen that the inputs to each of the $A_0$ and $B_0$ lines will be ANDed in the AND gate 47 and provide an output therefrom to the B input of the ALU 31 through switch 51. This B input will be exclusively ORed with the input on the A line which is a zero sent through switch 45 in the first stage as previously stated. The output from the ALU 31 will travel from the Q output thereof through the switch 43 to the A input of the ALU 33 where it will be exclusively ORed in the same manner with the output of the AND gate 49. This will continue on a stage by stage basis. However, as can be seen, the Bn input to each of the ALU circuits 31, 33, etc. has been selectively adjusted by a mask signal applied to the An input lines to provide the masking function. Furthermore, as can be seen, by closing of the switches 35, 35, 39 and 41 and opening of the switches 43, 45, 51 and 53, the circuit will operate in its standard manner with the additional circuitry utilized for the masking operation being essentially eliminated from the circuit.

It can be seen that there has been provided circuitry for utilizing the ALU circuits existing in computers, mini-computers, micro-computers and microprocessors for other purposed with a single instruction signal and only minor additional circuitry which circuitry is selectively electrically removable from the ALU circuits.

Though the invention has been described with respect to the specific preferred embodiments thereof, many variations and modifications will immediately become apparent to those skilled in the art. It is therefore the intention that the appended claims be interpreted as broadly as possible in view of the prior art to include all such variations and modifications.

We claim:

1. An ALU system, which comprises:
   (a) a plurality of ALU circuits, each ALU circuit including a pair of input terminals and an output terminal,
   (b) plural input lines, certain ones of said input lines normally connected to different ones of said input terminals,
   (c) plural output lines, each output line connected between a different one of the output terminals of one of said ALU circuits and one of the input terminals of a succeeding one of said ALU circuits to form a series circuit, said series circuit including a first ALU circuit,
   (d) first normally closed switch means controlling connection of said one of the input lines to each said ALU circuit,
   (e) second normally open switch means controlling connection of said output lines; and
   (f) control means coupled to said first and second switch means to simultaneously open said first switch means and close said second switch means, said control means including means to place a predetermined signal on the input terminal thereof controlled by said first swtich means.

2. An ALU system as set forth in claim 1 wherein each said ALU circuit operates as an exclusive OR circuit.

3. An ALU system which comprises:

(a) a plurality of ALU circuits, each ALU circuit including a pair of input terminals and an output terminal,
(b) plural input lines, one said input line normally connected to each one of said input terminals,
(c) plural output lines, each output line connected between the output terminal of one of said ALU circuits and one of the input terminals of a succeeding one of said ALU circuits to form a series circuit,
(d) first normally closed switch means controlling connection of said one of the input lines to each said ALU circuit,
(e) second normally closed switch means controlling connection of the other of the input lines to each said ALU circuit,
(f) third normally open switch means controlling connection of said output lines,
(g) an AND circuit associated with each ALU circuit, each of the input lines of each said ALU circuit also being coupled to the input of said AND circuit, the output of said AND circuit being coupled to the other input terminal of the associated ALU circuit,
(h) fourth normally open switch means controlling coupling of said outputs of said AND gates and said other inputs; and
(i) control means coupled to said first, second, third and fourth switch means to simultaneously open said first and second switch means and close said third and fourth switch means.

4. An ALU system as set forth in claim 3 wherein each said ALU circuit operates as an exclusive OR circuit.

5. An ALU system as set forth in claim 4 wherein said series circuit includes a first ALU circuit and wherein said control means also includes means to place a predetermined signal on the input terminal thereof controlled by said first switch means.

6. An ALU system as set forth in claim 3 wherein said series circuit includes a first ALU circuit and wherein said control means also includes means to place a predetermined signal on the input terminal thereof controlled by said first switch means.

7. An ALU system, which comprises:
(a) a plurality of ALU circuits, each ALU circuit including input terminal means and an output terminal,
(b) plural input lines, certain ones of said input lines normally connected to a different one of said input terminal means,
(c) plural output lines, each output line connected between different ones of the output terminals of one of said ALU circuits and one of the input terminals of a succeeding one of said ALU circuits to form a series circuit, said series circuit including a first ALU circuit,
(d) first normally closed switch means controlling connection of said input lines to their associated ALU circuit input terminal means,
(e) second normally open switch means controlling connection of said output lines; and
(f) control means coupled to said first and second switch means to simultaneously open said first switch means and close said second switch means, said control means including means to place a predetermined signal on the input terminal thereof controlled by said first switch means.

8. An ALU system as set forth in claim 7 wherein each said ALU circuit operates as an exclusive OR circuit.

* * * * *